United States Patent
Bruss et al.

(10) Patent No.: US 10,789,530 B2
(45) Date of Patent: Sep. 29, 2020

(54) NEURAL EMBEDDINGS OF TRANSACTION DATA

(71) Applicant: Capital One Services, LLC, McLean, VA (US)

(72) Inventors: Christopher Bruss, McLean, VA (US); Keegan Hines, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/246,911

(22) Filed: Jan. 14, 2019

(65) Prior Publication Data

US 2020/0226460 A1 Jul. 16, 2020

(51) Int. Cl.
*G06N 3/08* (2006.01)
*G06N 20/00* (2019.01)
*G06Q 20/16* (2012.01)
*G06F 16/25* (2019.01)

(52) U.S. Cl.
CPC ............ *G06N 3/08* (2013.01); *G06F 16/254* (2019.01); *G06N 20/00* (2019.01); *G06Q 20/16* (2013.01)

(58) Field of Classification Search
CPC ............ G06N 3/04; G06N 20/00; G06N 3/08
See application file for complete search history.

(56) References Cited

U.S. PATENT DOCUMENTS 9,659,248 B1 * 5/2017 Barbosa .............. G06F 17/2785

OTHER PUBLICATIONS

Ziegler, Konstantin, et al., "Injecting semantic background knowledge into neural networks using graph ennbeddings", 2017 IEEE 26th Int'l Conf. on Enabling Technologies: Infrastructure for Collaborative Enterprises (WETICE), 2017, pp. 200-205. (Year: 2017).*
S. Cao, W. Lu, and Q. Xu, "Deep neural networks for learning graph representations", Proc. 13th AAAI Conf. on Artificial Intel., AAAI-16), pp. 1145-1152, 2016. (Year: 2016).*
A.C. Bahnsen et al., "Feature engineering strategies for credit card fraud detection", Expert Sys. with Applications, vol. 51, 2016, pp. 134-142. (Year: 2016).*
Kuveljic, Stanko, "Beyond Word2Vec Usage for Only Words", Jan. 2018 [online] KDNuggets™ [retrieved on Jan. 14, 2019]. Retrieved from the Internet URL: https://www.kdnuggets.com/2018/01/beyond-word2vec-for-words.html.

(Continued)

*Primary Examiner* — Vincent Gonzales

(57) ABSTRACT

Systems, methods, and computer program products to provide neural embeddings of transaction data. A network graph of transaction data based on a plurality of transactions may be received. The network graph of transaction data may define relationships between the transactions, each transaction associated with at least a merchant and an account. A neural network may be trained based on training data comprising a plurality of positive entity pairs and a plurality of negative entity pairs. An embedding function may then encode transaction data for a first new transaction. An embeddings layer of the neural network may determine a vector for the first new transaction based on the encoded transaction data for the first new transaction. A similarity between the vectors for the transactions may be determined. The first new transaction may be determined to be related to the second transaction based on the similarity.

20 Claims, 7 Drawing Sheets

(56) References Cited

OTHER PUBLICATIONS

Shogry, B., "Making Sense of messy bank data", Aug. 23, 2017 [online] Plaid blog [retrieved on Jan. 14, 2019]. Retrieved from the Internet URL: https://blog.plaid.com/making-sense-of-messy-data/.

Krishan, "How to Use Words Co-Occurrence Statistics to Map Words to Vectors", Jun. 2015 [online] WordPress [retrieved on Jan. 14, 2019]. Retrieved from Internet URL: https://iksinc.online/2015/06/23/how-to-use-words-co-occurrence-statistics-to-map-words-to-vectors/.

Chablani, M., et al., "Word2Vec (skip-gram model): Part 1—Intuition", Jun. 2017 [online], Towards Data Science [retrieved on Jan. 14, 2019]. Retrieved from Internet URL: https://medium.com/towards-data-science/word2vec-skip-gram-model-part-1-intuition-78614e4d6e0b.

Author unknown, "Vector Representation of Words", Dec. 2018 [online] TensorFlow™ tutorial [retrieved on Jan. 14, 2019]. Retrieved from Internet URL: https://www.tensorflow.org/tutorials/representation/word2vec.

Kipf, T., et al., "Semi-Supervised Classification with Graph Convolutional Networks", Cornell University [online], Submitted on Sep. 9, 2016 (v1), last revised Feb. 22, 2017 (this version, v4). Retrieved from Internet URL: <https://arxiv.org/abs/1609.02907>. Retrieved on Apr. 8, 2020, 2 pages.

Kipf, T., et al., "Graph Convolutional Networks", Tkipf.github.io [online], Uploaded on Sep. 30, 2016. Retrieved from Internet URL: <https://tkipf.github.io/graph-convolutional-networks/>. Retrieved on Apr. 8, 2020, 15 pages.

Godec, P, "Graph Embeddings—The Summary", Towards Data Science [online], Uploaded Dec. 311, 2018. Retrieved from Internet URL: <https://towardsdatascience.com/graph-embeddings-the-summary-cc6075aba007?gi=61b56f320ee0>. Retrieved on Apr. 8, 2020, 11 pages.

\* cited by examiner

US 10,789,530 B2

NEURAL EMBEDDINGS OF TRANSACTION DATA

TECHNICAL FIELD

Embodiments herein generally relate to computing, and more specifically, to computing solutions to provide neural embeddings of transaction data.

BACKGROUND

Financial transactions represent a large network of relationships between entities. These entities can include relationships between merchants and account holders, accounts and other accounts, financial institutions and other financial institutions, and equity holders or bond holders and companies. Such transaction networks are very high dimensional (e.g., millions or billions of entities) yet are simultaneously very sparse, as any given entity only interacts with a small subset of other entities. Using these types of networks in machine learning is difficult because of the high-dimensionality and sparsity properties, and conventional machine learning models cannot scale to learn weights for the full dimensions of the network. Some conventional machine learning models use blunt techniques to reduce the dimensionality or the sparsity to a manageable size. However, these techniques lose significant amounts of relevant information on the relationships between entities in these networks.

SUMMARY

Embodiments disclosed herein include systems, methods, and computer program products to provide neural embeddings of transaction data. In one example, a network graph of transaction data based on a plurality of transactions may be received. The network graph of transaction data may define relationships between the plurality of transactions, each transaction associated with at least a merchant and one account of a plurality of accounts. A neural network may be trained based on training data comprising a plurality of positive entity pairs from the network graph of transaction data and a plurality of negative entity pairs not present in the network graph of transaction data, the negative entity pairs comprising artificially generated relationships between each entity in the negative entity pair, the neural network comprising an embeddings layer. An embedding function may then encode transaction data for a first new transaction. The embeddings layer of the neural network may determine a vector for the first new transaction based on the encoded transaction data for the first new transaction. A similarity between the vector for the first new transaction and a vector for a second transaction may then be determined. The first new transaction may be determined to be related to the second transaction based on the similarity between the vector for the first new transaction and the vector for the second transaction.

DETAILED DESCRIPTION

Figure 1:
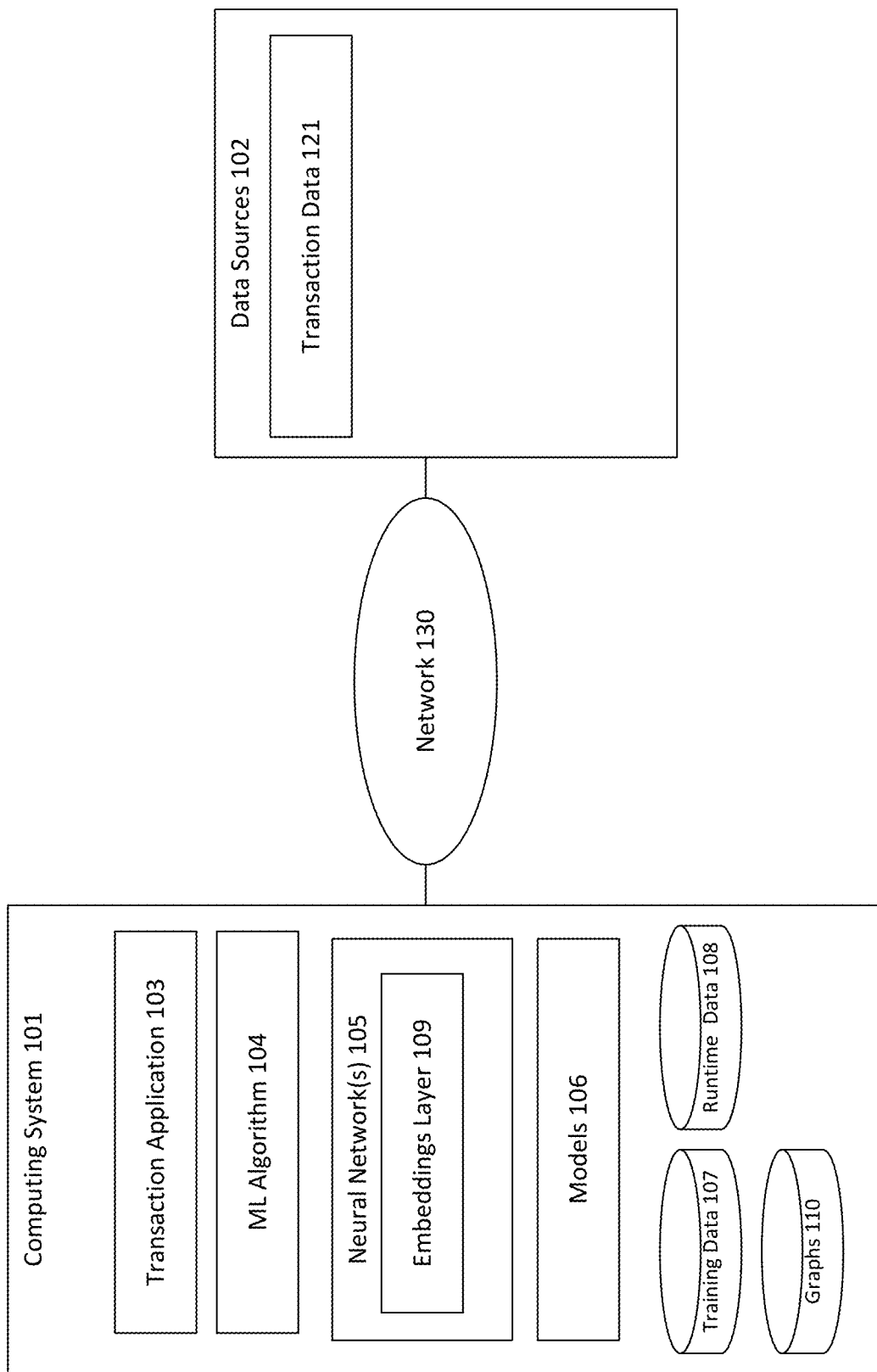
FIG. 1 illustrates an embodiment of a system.

Embodiments disclosed herein provide techniques to learn a low-dimensional dense representation for each entity in a network graph of transactions. The entities in the network graph of transactions may include consumers, merchants, and/or other entities involved in a given transaction in the network graph of transactions. The low-dimensional dense representation includes all information about each entity, such as the places a customer shops, and what types of customers shop at a given merchant. The low-dimensional dense representation for each entity may generally be referred to herein as an embedding. In at least one embodiment, the embeddings for each entity form of an embeddings layer of a neural network. More generally, the embeddings are in a high-dimensional space, where related entities and/or transactions are closer to each other in the high-dimensional space, and unrelated entities and/or transactions are more distant from each other in the high-dimensional space. Once the neural network is trained, subsequent transactions can be analyzed using the neural network and/or other models generated based on the embeddings for any purpose. For example, the transactions may be analyzed to identify anomalous transactions, fraud, money laundering, decisions to extend credit, asset purchase recommendations, etc.

Advantageously, embodiments disclosed herein successfully generate rich representations of relationships between entities in a network graph of transactions. The relationships capture all data describing each entity in the network graph, even though the network graph of transactions is of high-dimensionality and is very sparse since each entity only interacts with a small subset of other entities. Prior attempts to represent the relationships between entities were forced to eliminate some data describing the relationships to make the solution tractable. Advantageously, embodiments disclosed herein retain all data describing each entity (e.g., merchant accounts, customer accounts, etc.), thereby generating an improved solution that exposes robust features that can be used for any number and type of purpose.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes at least one computing system 101 and one or more data sources 102 connected via a network 130. The computing system 101 and data sources 102 are representative of any type of computing system or device, such as a server, compute cluster, cloud computing environment, virtualized computing system, and the like. The data sources 102 are further representative of entities such as databases, files, and transaction logs including transaction data 121. Generally, the data sources 102 provide transaction data 121 that is updated periodically as new transactions are processed (e.g., hourly, daily, weekly, etc.).

The transaction data 121 is raw transaction data describing a plurality of card-based transactions, such as credit card transactions, debit card transactions, gift card transactions, and the like. The use of a particular payment type should not be considered limiting of the disclosure, as the disclosure is equally applicable to all types of transaction data. In one embodiment, the transaction data 121 is provided by the issuer of the cards used to complete each transaction. The transaction data 121 may include any number and type of attributes describing a given transaction. For example, the transaction data 121 may include at least an account identifier (e.g., a customer account number, a customer credit card number, a merchant account number, etc.), a merchant identifier (e.g., a merchant name), a timestamp associated with the transaction, an amount of the transaction, and a location of the transaction, among many other data attributes. As such, the data space of the transaction data 121 is high-dimensional, including data describing millions (or more) of unique accounts and merchants.

The transaction data 121 defines relationships between customer accounts and merchants. For example, when a customer purchases an item from a merchant, a relationship is defined. Similarly, when a merchant transacts with another merchant, a relationship is defined. Thus, the transaction data 121 can be leveraged to expose a variety of different attributes of the accounts, such as account activity, customer preferences, similarity to other accounts, and the like. However, the transaction data 121 is sparse, as any given customer account (which includes merchant accounts that perform transactions with other merchants) interacts with a small fraction of merchants. Similarly, any given merchant may interact with a fraction of the customer accounts. Therefore, the transaction data 121 implicitly creates a bipartite graph between accounts. This sparse, high-dimensional space is very difficult to use for desirable analysis purposes. Advantageously, however, the system 100 is configured to overcome these limitations and leverage the transaction data 121 to provide useful analytical tools, thereby exposing new functionality based on the transaction data 121 in its entirety.

As shown, the computing system 101 includes a transaction application 103, a machine learning (ML) algorithm 104, one or more neural networks 105, one or more models 106, a data store of training data 107, a data store of runtime data 108, and one or more graphs 110. The transaction application 103 may receive the transaction data 121 of prior transactions from the data sources 102 to generate a network graph 110 of the transactions using one or more ETL functions. The ETL functions may generally include standardizing the transaction data 121 according to one or more formats, and assigning each unique entity (e.g., customer accounts and/or merchant accounts) a unique identifier.

The transaction application 103 may then train one or more neural networks 105 using the ML algorithm 104 and the training data 107. The training data 107 includes positive samples from the transaction data 121 and/or the graphs 110, where a positive sample is defined as an actual transaction that has a contextual relationship between a pair of entities in the transaction data 121 and/or the graphs 110. For example, an actual transaction between a customer account that has made one or more purchases from a merchant may be used as a positive sample. As another example, the transactions of a first customer and a second customer who each make purchases at a first merchant may be defined as a positive sample, as these customer transactions may be considered as related. As yet another example, a customer may make purchases at merchants A and B. Therefore, the transactions of customer A with merchants A and B may be considered as related and used as a positive sample in the training data 107.

As stated, in some embodiments, related entities and/or transactions may be subject to a contextual constraint. For example, if the customer makes purchases at merchants A and B within a time threshold (e.g., within an hour, a day, etc.), the transactions between the customer and merchants A and B may be considered to be within the same context and used as positive samples. If, however, the customer makes purchases at merchants A and B months apart, the transactions with merchants A and B may not be considered as related and are therefore not used as positive samples in the training data 107. More generally, the transaction application 103 may consider any attribute in the transaction data 121 and/or the graphs 110 that indicate a contextual relationship when generating positive samples.

Furthermore, the training data 107 may include negative samples from the transaction data 121 and/or the graphs 110, where a negative sample is defined as an artificially generated relationship that does not exist. For example, if a customer has never made a purchase at merchant C, a transaction between the customer and merchant C may be generated as a negative sample in the training data 107. As another example, if a customer makes a purchase at merchant A on one day and a purchase at merchant C on the following day, these transactions may not share a contextual relationship. However, a negative sample relating these transactions may be generated as a negative sample in the training data 107. More generally, the transaction application 103 may consider any attribute in the transaction data 121 and/or the graphs 110 that indicate the lack of an actual relationship when generating negative samples in the training data 107. By defining the positive and negative samples, the foundation of supervised learning to train the neural network 105 is provided.

Generally, during the training of the neural network 105, an embeddings layer 109 of the neural network 105 is generated. In at least one embodiment, an embeddings layer 109 is an n-dimensional lookup table of floating point numerical values. In such embodiments, each unique entity ID (e.g., customer ID and merchant ID) in the graph 110 and/or transaction data 121 is assigned a unique identifier corresponding to a row in the lookup table, such that each unique entity is represented in the embeddings layer 109. In some embodiments, the embedding table 109 is initialized with initial values, which may be randomly assigned.

Figure 2:
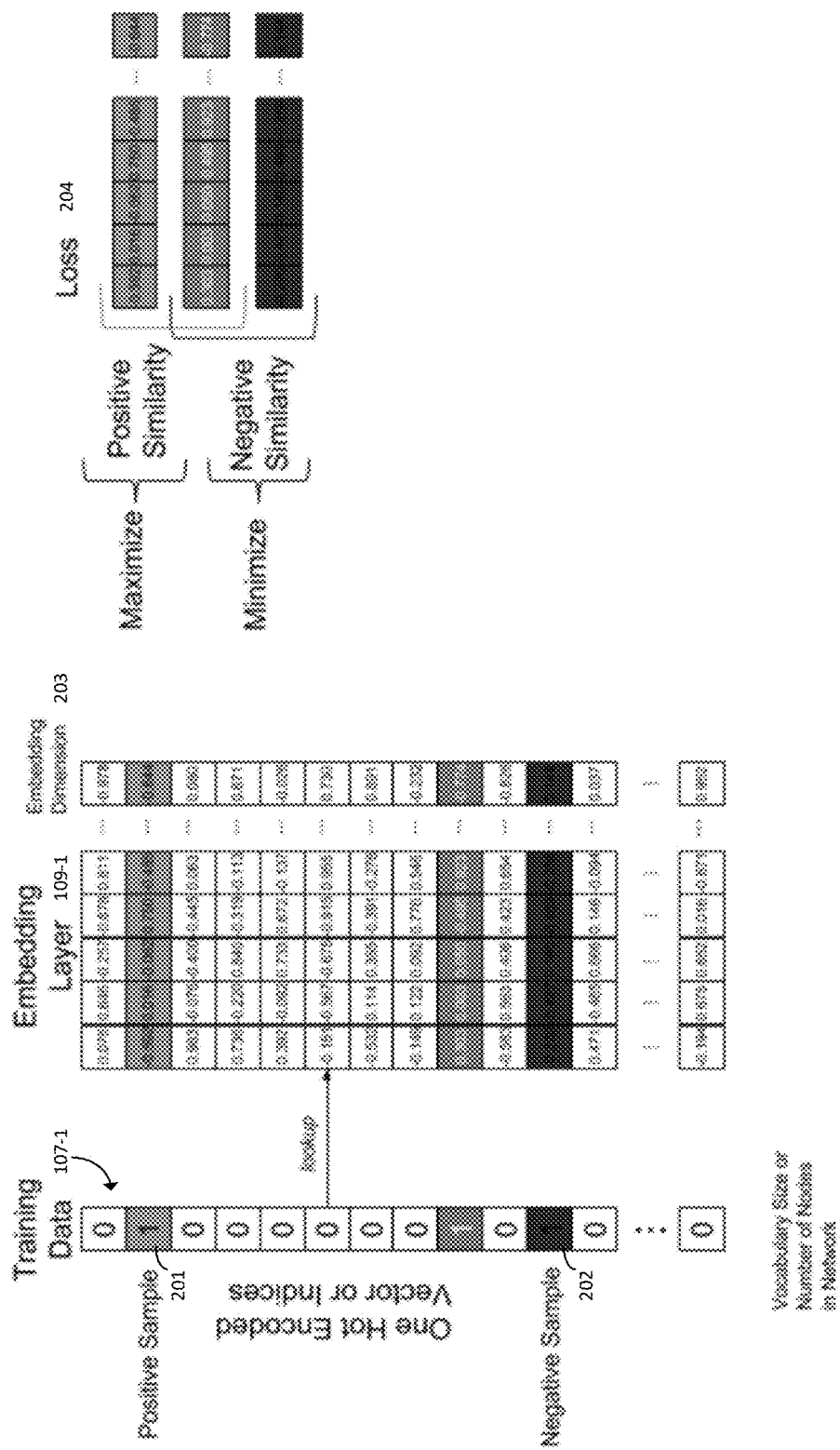
FIG. 2 illustrates an example of training a neural network.

FIG. 2 is a schematic 200 depicting the training of the neural network 105 in greater detail. As shown, an example element of training data 107-1 is represented as a one-hot encoded vector of indices. In such an embodiment, the one-hot encoded vector includes a value of "1" for the transaction and/or entity that is being used as the current element of training data 107-1. For example, as shown, the one-hot vector of training data 107-1 includes at least a positive sample 201 and a negative sample 202. The one-hot vector of training data 107-1 is then provided as input to the neural network 105, which looks up and returns the corresponding rows of the embeddings layer 109 (e.g., the rows for positive sample 201 and negative sample 202). The neural network 105 may then compare returned rows of the embeddings layer 109-1 (e.g., the transaction vector for each transaction). For example, the neural network 105 may compute a similarity between the returned rows of the embeddings layer 109-1. The similarity may comprise cosine similarity, inner products, or any similarity function between two or more vectors. Conversely, in some embodiments, a distance function may be used to compare two or more vectors. Doing so may generate values which indicate the distance between each transaction pair in the training data 107-1 in the n-dimensional embedding space of the embeddings layer 109-1. The n-dimensional embedding space of the embeddings layer 109-1 may be defined by the embedding dimension 203 of the embeddings layer 109-1. In one embodiment, the embedding dimension 203 may be based on the number of columns of the embeddings layer 109-1.

As stated, the training data 107-1 includes positive samples and negative samples. These samples may be labeled to indicate whether the sample is a positive sample or a negative sample. Doing so allows the neural network 105 to determine a loss 204 during training. For example, if the neural network 105 determines that the transactions of a positive sample are not related, the weights of the neural network 105 will be refined via backpropagation to maximize the positive similarity between the transactions of the positive sample. As another example, if the neural network 105 determines that the transactions of a negative sample are related, the values of the embeddings layer 109-1 will be refined via backpropagation to minimize the negative similarity between the transactions of the negative sample. The maximization and minimization of values in the embeddings layer 109-1 may be relative to the initial values of the embeddings layer 109-1 and/or the current values of the embeddings layer 109-1 as the weights are refined during each training iteration.

In one embodiment, the loss function for the neural network 105 may be defined by the following Equation 1:

$$\sum_{\substack{(a,b) \in E^+ \\ b^{-1} \in E^-}} L^{batch}(sim(a, b), sim(a, b_1^-), \ldots , sim(a, b_k^-)). \quad \text{Equation 1}$$

In Equation 1, the positive entity pairs are represented by $(a, b) \in E^+$, and the "k" number of negative entity pairs are represented by $b_i^- \in E^-$. In one embodiment, 256 negative entity pairs are selected for a given positive entity pair. Furthermore, the similarity function is represented by $sim(a, b)$, where the similarity function comprises a cosine similarity and/or an inner product of the corresponding vectors of the entity pairs. Furthermore, $L^{batch}$ corresponds to the loss function, which in one embodiment is a logistic loss. Generally, the neural network 105 is trained over a desired number of iterations of training data 107 (e.g., a million, 10 million, etc. elements of training data) and/or or to a desired loss. Once trained, the values of the embeddings layer 109 of the neural network 105 are refined such that related transactions are placed together in the embedding space (e.g., based on distance in the embedding space, cosine similarity, and/or inner products), and unrelated transactions are further apart in the embedding space. For example, in the graph 300 depicted in FIG. 3, related transactions are clustered together, such that transactions in group 301 are considered to be related, transactions in group 302 are considered to be related, and transactions in group 303 are considered to be related.

In one embodiment, the neural network 105 is trained in parallel by a plurality of different instances of the transaction application 103 and/or the neural network 105 (not pictured). In such an embodiment, the instances of the transaction application 103 and neural network 105 may be distributed over a plurality of different compute nodes to perform parallel processing as needed. In such embodiments, the parallel processing is asynchronous, as each instance does not communicate with another instance. Each instance of the transaction application 103 and the neural network 105 receives a distinct subset of the training data 107. Each instance of the transaction application 103 and/or the neural network 105 may then request the latest version of the embeddings layer 109 vectors stored in a centralized server for corresponding to the entities in the received subset of the training data 107. Given the training data 107, each instance of the transaction application 103 and the neural network 105 updates the vectors of the embeddings layer 109 it has received and sends updates to the centralized server. Doing so provides massively parallel training of the neural network 105, which may help overcome the high-dimensionality of the transaction data 121 described above.

Returning to FIG. 1, once the training of the neural network 105 is complete, the neural network 105 may be used to process new transactions received as runtime data 108. The runtime data 108 includes one or more new transactions received as transaction data 121 from the data sources 102, where the runtime data 108 is different than the training data 107. In at least one embodiment, the transaction application 103 may apply an embedding function (not pictured) to the received transaction in the runtime data 108. The embedding function may be any function that generates a vector representation of the transaction. For example, the embedding function may generate a vector based on the account ID, merchant name, location, and purchase amount, where the vector reflects the account ID, merchant name, and purchase amount now compressed into a lower dimensional embedding representation.

The neural network 105 may then process the vector for the transaction in the runtime data 108. Doing so may generate an output in an n-dimensional space which reflects which other transactions the transaction in the runtime data 108 is related to. Doing so allows the transaction application 103 to perform any number of functions, such as fraud detection, anomaly detection, transaction clustering, generating recommendations, predicting transaction amounts, credit approvals, purchase approvals, and the like. Furthermore, after the training of the neural network 105, one or more models 106 may be trained based on the embeddings layer 109 of the neural network 105. The models 106 may be any type of model, such as a density model, machine learning models, and the like. Some models 106 may be generated for a single account, while other models 106 may consider all accounts. The trained models 106 generally learn which features are important for a given task. The transaction application 103 may leverage the models 106 when performing the above-described functions, such as anomaly detection, fraud detection, etc.

For example, returning to FIG. 3, a transaction x' may be represented by point 304 in the graph 300. However, as part of fraud and/or anomaly detection, the transaction application 103 may expect the transaction x' to be clustered with one of the groups 301-303 based on any number of attributes. For example, a density model 106 may be generated for the account used to pay for the transaction, providing a "local" anomaly estimate relative to typical activity on the account. The density model 106 may then be used to determine how likely the transaction x' is fraud or an anomaly using the following equation 2:

$$p(x'|Aj) \propto F(x'|Aj, \hat{\theta}j)$$ Equation 2.

Generally, Equation 2 reflects the likelihood that the transaction x' is for the account Aj. If the probability p exceeds an expected value, the transaction application 103 may trigger a fraud alert on the account. As another example, the transaction application 103 may consider the distance between point 304 in the graph 300 and the expected value. For example, if the transactions for the account j cluster in group 303, the transaction application 103 may determine a distance between point 304 and group 303 exceeds a threshold distance and trigger the fraud alert on the account.

As another example, the transaction application 103 may consider a model 106 that is generated based on all transactions across all accounts. In such an embodiment, the transaction application 103 may determine that accounts that look like account j do not usually have transactions of the associated amount with merchants that look like merchant k. Stated differently, the transaction application 103 may apply equation 3 to determine whether the transaction x' is attempted fraud or an anomaly:

$$p(x'|x) \propto F(x'|x, \hat{\theta})$$ Equation 3.

Generally, because the model 106 is estimated across all transactions for all accounts, equation 3 allows the transaction application 103 to make comparisons across accounts that appear to be similar. If the transaction x' is not within a threshold distance and/or similarity, the transaction application 103 may trigger a fraud alert on the account.

Figure 3:
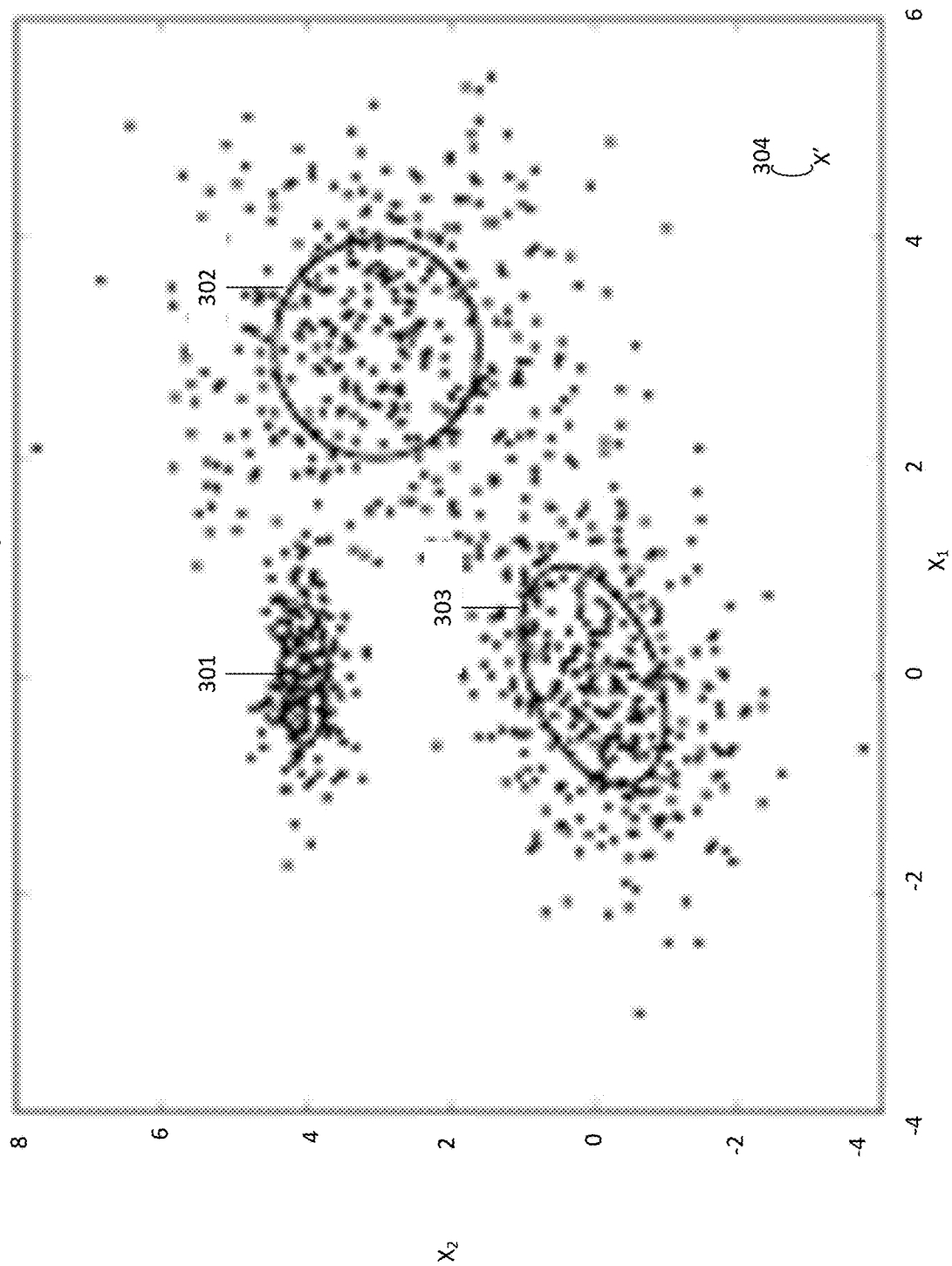
FIG. 3 illustrates an example graph.

In addition, the transaction application 103 may provide anti-money laundering measures using the neural network 105 and/or models 106. For example, the transaction application 103 may receive transaction data describing an account that is known to have engaged in money laundering. Using the neural network 105 and/or the models 106, the transaction application 103 may determine one or more other accounts that are engaging in similar transaction activity with similar merchants. For example, if group 301 in FIG. 3 is associated with known money laundering activities, new transactions that cluster into group 301 may be flagged as potential money laundering transactions, and the transaction application 103 may generate a money laundering notification.

Furthermore, the transaction application 103 may provide targeting marketing and/or cross-selling functionality using the neural network 105 and/or models 106. For example, the transaction application 103 may receive transaction data describing an account that is known to be profitable across one or more lines of business. Using the neural network 105 and/or the models 106, the transaction application 103 may determine one or more other accounts that are similar to the profitable account and identify these accounts as potential targets for cross-marketing opportunities. For example, if the profitable account is within group 303 in FIG. 3, other accounts in group 303 may be flagged as potential targets for cross-marketing opportunities.

Further still, the transaction application 103 may provide recommendations using the neural network 105 and/or models 106. For example, a customer who lives in Washington, D.C. may be traveling to New York City. In such an example, the transaction application 103 may identify, using the embeddings 109 of the neural network 105, merchants located in New York City that are similar to merchants located in Washington, D.C. that the customer has previously transacted with. Therefore, the transaction application 103 may generate a list of recommended merchants and output the list for display on the customer's device. As another example, the transaction application 103 can generate recommendations using "analogy games". For example, using the embeddings 109, the transaction application 103 may compute the following Equation 4:

[Merchant A, Washington, D.C.]–Washington, D.C.+New York=Merchant B  Equation 4.

Based on the embeddings 109, equation 4 will return Merchant B that is similar to Merchant A, where Merchant B is located in New York. Therefore, the transaction application 103 may recommend to the customer that they visit Merchant B during their trip to New York City.

Figure 4:
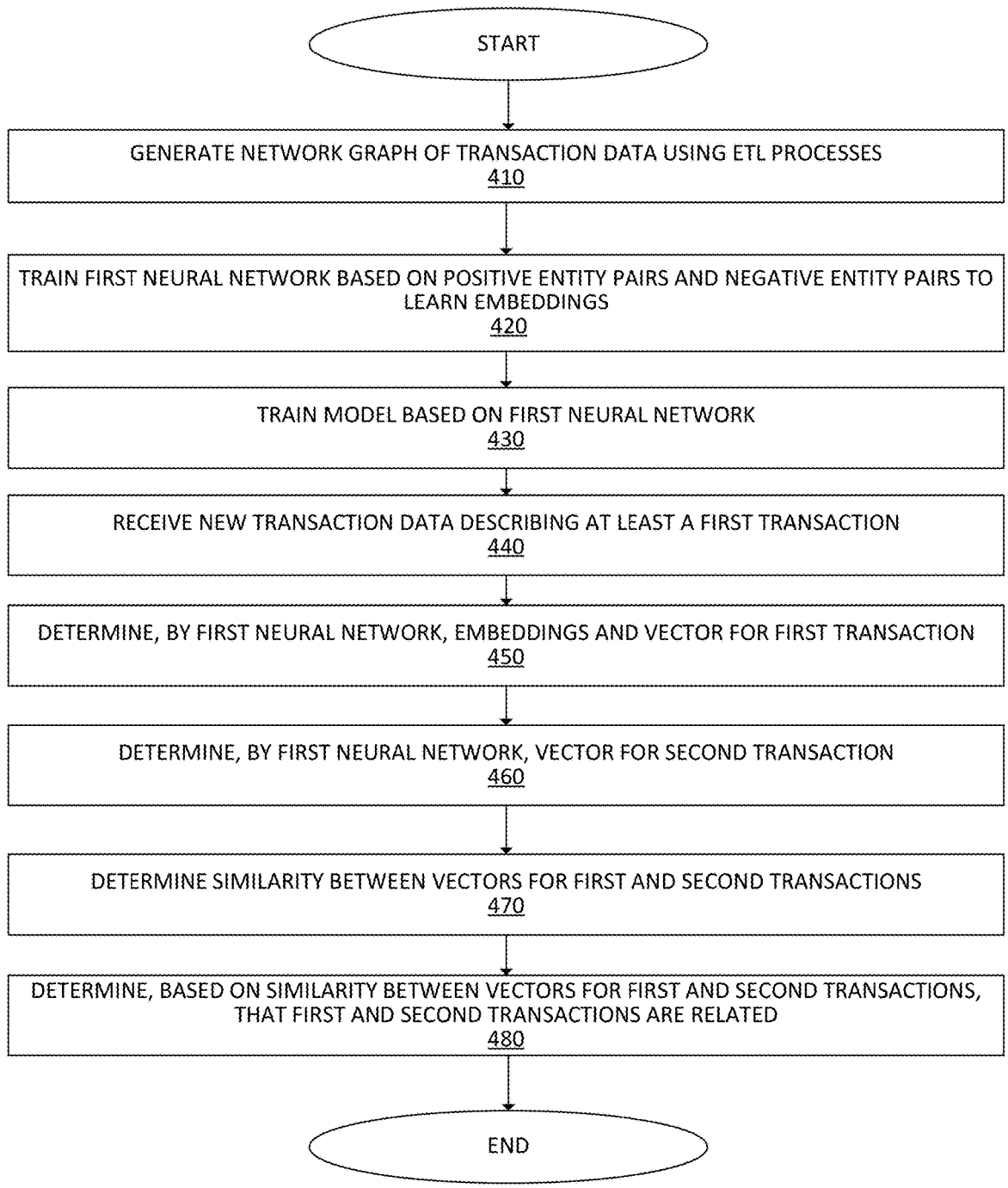
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to provide neural embeddings of transaction data. Embodiments are not limited in this context.

As shown, the logic flow 400 begins at block 410, where the transaction application 103 generates a network graph 110 of transaction data 121 using one or more ETL processes. As stated, the network graph 110 defines relationships between accounts involved in each transaction in the transaction data 121. At block 420, the transaction application 103 trains a first neural network 105 using an ML algorithm 104 (e.g., a neural network algorithm) based on positive entity pairs and negative entity pairs as training data 107 to learn the embeddings layer 109 of the neural network 105. As stated, the positive entity pairs include actual transaction (and/or account) pairs in the transaction data 121 and/or the network graph 110, while the negative entity pairs include artificially generated transaction (and/or account)

pairs. Stated differently, the negative entity pairs do not exist in the transaction data 121 and/or the network graph 110.

At block 430, the transaction application 103 trains one or more models 106 based on the first neural network 105 generated at block 420. As stated, the models 106 may include density models for the transactions. The models 106 may be generated based on one or more accounts in the transaction data 121 and/or the network graph 110. At block 440, the transaction application 103 receives new transaction data 121 describing at least a first new transaction. The transaction application 103 and/or the first neural network 105 may apply an embedding function (or an encoding function) to the transaction data 121, thereby generating an input vector describing the first new transaction. At block 450, the first neural network 105 uses the embeddings layer 109 as a lookup table to identify the embeddings 109 for the input vector of the first new transaction, e.g., based on the account identifier in the transaction data for the first transaction. The embeddings layer 109 then outputs an embedding vector describing the first new transaction.

At block 460, the first neural network 105 determines an embedding vector for a second transaction. The second transaction may be identified based on any criteria, such as sharing a common account with the first transaction, a common merchant with the first transaction, etc. At block 470, the transaction application 103 and/or the first neural network 105 determines a similarity between the vectors for the first and second transactions. The similarity may be based on any factor, such as a difference between the vectors, a cosine similarity of the vectors, and/or an inner product of the vectors. At block 480, the transaction application 103 and/or the first neural network 105 determines, based on the similarity between the vectors for the first and second transactions, that the first and second transactions are related. As stated, the first neural network 105 places similar transactions more closely together in an n-dimensional space, while dissimilar transactions are further apart. Therefore, for example, if the similarity is within a threshold degree of similarity (e.g., a threshold distance between the vectors, a threshold cosine similarity measure, and/or a threshold inner product of the vectors), the transactions are determined to be related. In some embodiments, the transaction application 103 may perform an operation based on the determined similarity of the vectors. For example, if the distance between the vector for the first transaction is beyond a threshold distance of all other transactions for the account associated with the first transaction, the transaction application 103 may determine that the first transaction is indicative of fraud and may generate a fraud alert for the account. Furthermore, one or more models 106 may process the first transaction, e.g., for anomaly detection, fraud alerts, generating recommendations, etc.

Figure 5:
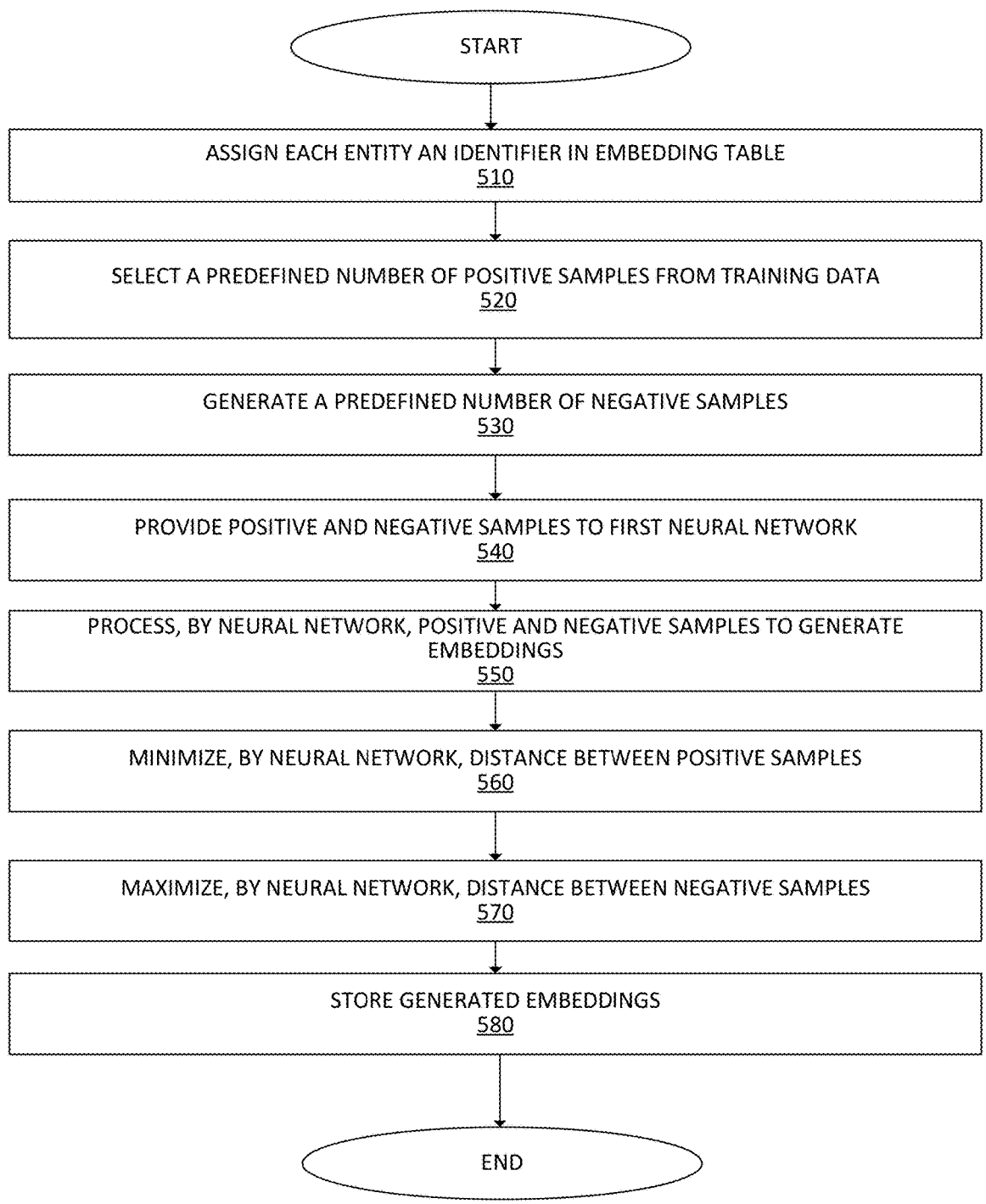
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations performed to train a neural network 105. Embodiments are not limited in this context.

As shown, the logic flow 500 begins at block 510, where a unique identifier is assigned in the embeddings layer 109 for each entity (e.g., customer accounts, merchant accounts, other types of accounts) in the network graph 110. At block 520, a predefined number of positive samples are selected from the network graph 110. At block 530, a predefined number of negative samples are generated for each positive sample. At block 540, the positive and negative samples are provided as input data to the neural network 105. At block 550, the neural network 105 processes the positive and negative samples to generate the embeddings 109. As stated, each of the positive samples and negative samples may be labeled with a correct output. Therefore, the neural network 105 learns over time which pairs are related and which pairs are not related. Through backpropagation and gradient descent, the weights of the neural network 105, including the values of the embeddings layer 109, are refined. More specifically, as reflected at block 560, the neural network 105 refines the values of the embeddings layer 109 such that the distance between positive samples is minimized. Similarly, at block 570, the neural network 105 refines the values of the embeddings layer such that the distance between negative samples is maximized. At block 580, the neural network 105 including the generated embeddings layer 109 is stored for later use.

Figure 6:
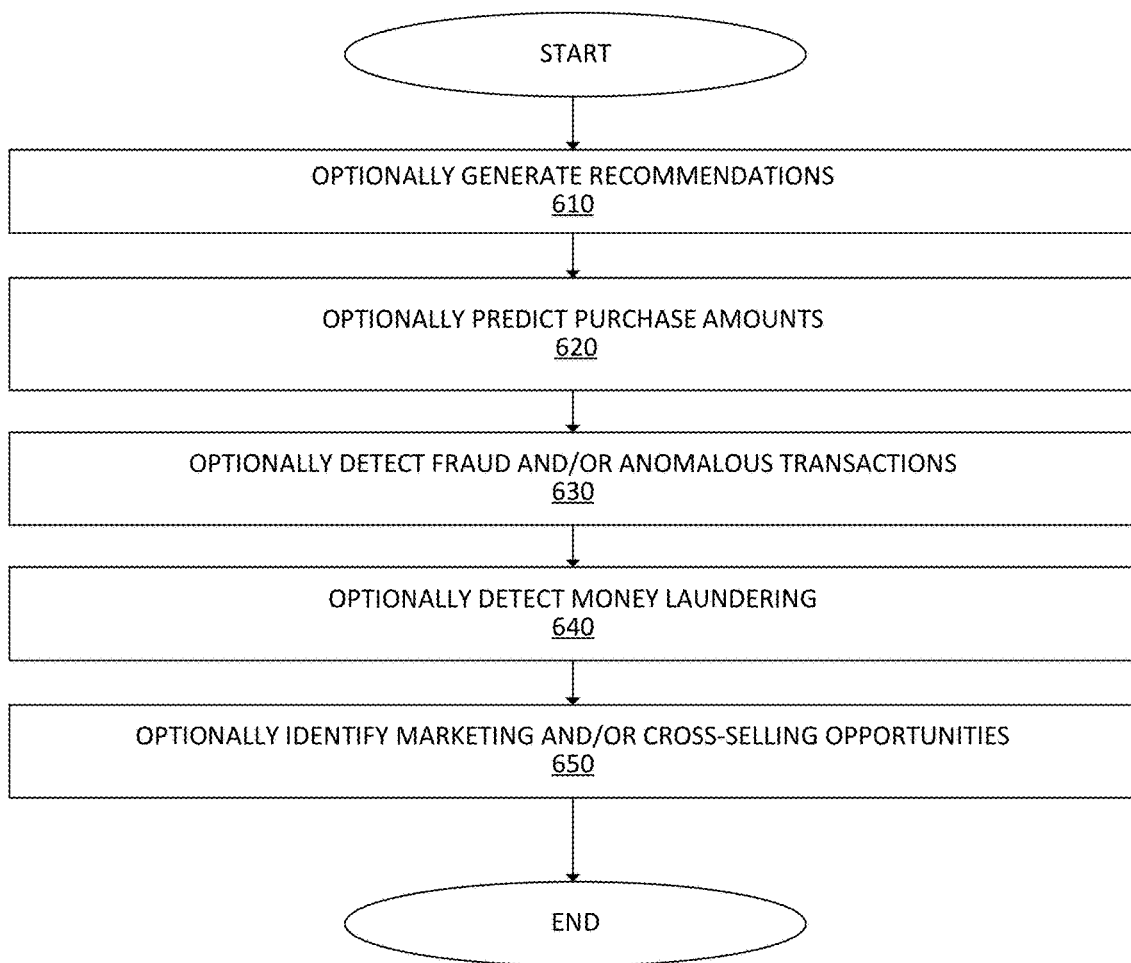
FIG. 6 illustrates an embodiment of a third logic flow.

FIG. 6 illustrates an embodiment of a logic flow 600. The logic flow 600 may be representative of some or all of the operations executed by one or more embodiments described herein. For example, the logic flow 600 may include some or all of the operations performed based on the embeddings layer 109 of the neural network 105 and/or the models 106. Embodiments are not limited in this context.

As shown, the logic flow 600 begins at block 610, where recommendations are generated for a user. Generally, using the neural network 105 and/or one or more models 106, merchant recommendations may be made for a customer. The recommendations may be based on location, similar accounts, merchant type, etc. For example, a user who frequently shops at merchant A may be provided a recommendation to visit merchant B, e.g., based on the type of merchant, the locations of the merchant, etc. At block 620, purchase amounts for transactions may be predicted. For example, as stated, the embeddings 109 may be trained based on transaction amounts in the transaction data 121. Therefore, the transaction amounts may achieve a distributed representation throughout the embedding space. Therefore, the embeddings 109 may be used to predict a transaction amount given one or more parameters such as account, merchant, location, time, etc.

At block 630, fraud and/or anomalous transactions may be detected. For example, the first transaction received at block 440 may be associated with a first customer account. However, all other transactions associated with the first customer account may be clustered near each other in the embedding space. Therefore, if the first transaction is a threshold distance from one or more of the other transactions, the first transaction may be indicative of a fraudulent transaction and/or an anomaly. In such an example, the transaction application 103 may generate and output a fraud alert and/or another type of alert for the first customer account (e.g., within an internal fraud alert system maintained by the card issuer, on a mobile device associated with the user, etc.).

At block 640, money laundering operations may be detected using the embeddings layer 109 and/or the models 106. For example, given an account that is known to have engaged in money laundering, the neural network 105 and/or the models 106 may return one or more other accounts that are engaging in similar transaction activity with similar merchants. As such, the transaction application 103 may generate and output a potential money laundering alert for review. At block 650, marketing and/or cross-selling opportunities may be identified using the neural network 105 and/or the models 106. For example, given an account that is known to be profitable, the neural network 105 and/or the models 106 may return one or more other accounts that are similar to the input account, and that may be similarly profitable. A list of the identified accounts may then be provided to the appropriate business units for review.

Figure 7:
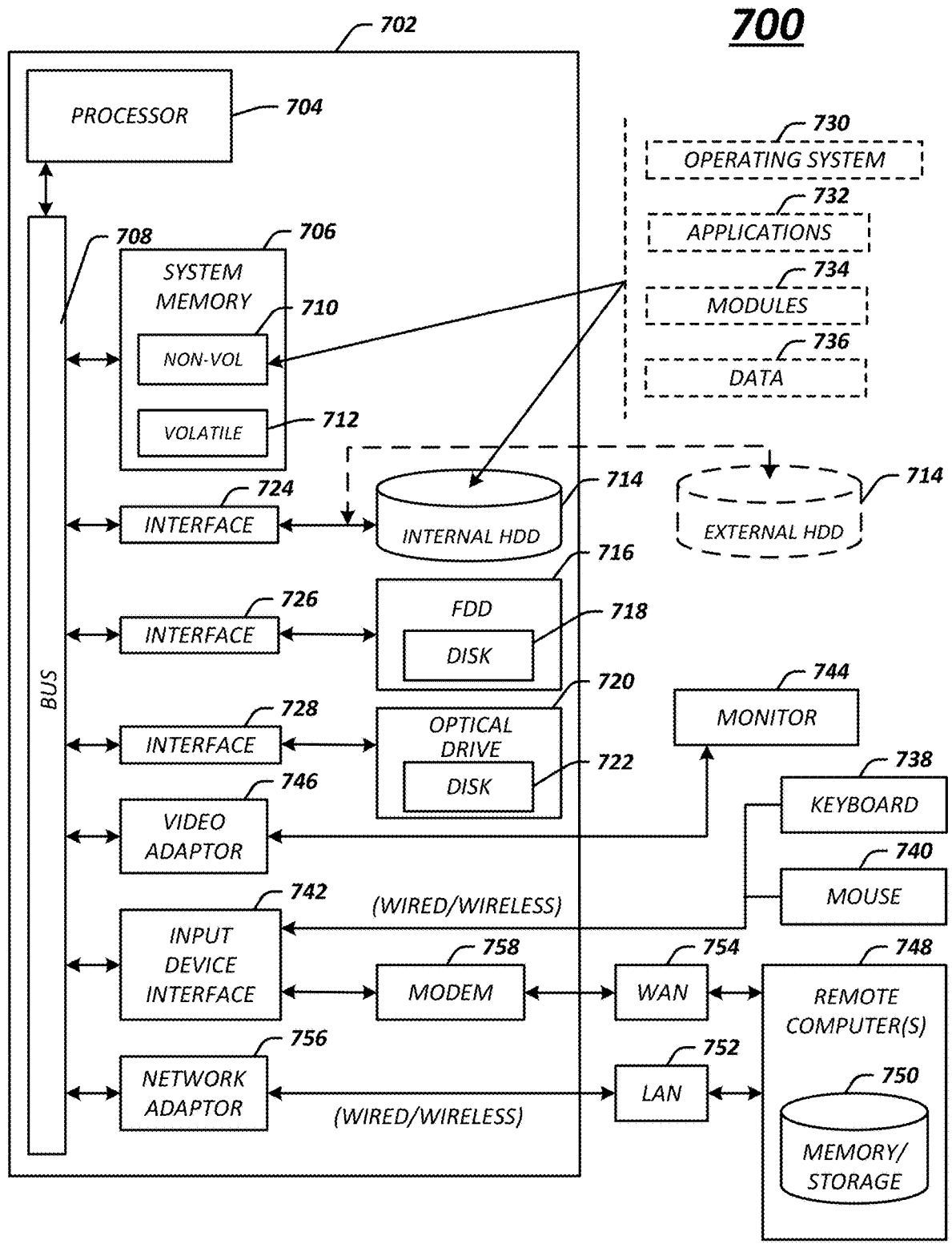
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the system 100. In some embodiments, computing system 702 may be representative, for example, of the computing system 101 and data sources 102 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100, e.g., transaction application 103, ML algorithm 104, neural networks 105, models 106, training data 107, runtime data 108, embeddings 109, graphs 110, and transaction data 121.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
    a processor circuit; and
    a memory storing instructions which when executed by the processor circuit cause the processor circuit to:
        receive a network graph of transaction data based on a plurality of transactions, the network graph of transaction data defining relationships between the plurality of transactions, each transaction associated with at least a merchant and one account of a plurality of accounts, the network graph based on a transaction log for a plurality of prior transactions, the transaction log specifying, for each prior transaction, a customer account, a merchant, a timestamp, and a transaction amount;
        train a neural network based on training data comprising a plurality of positive entity pairs from the network graph of transaction data and a plurality of negative entity pairs not present in the network graph of transaction data, the negative entity pairs comprising artificially generated relationships between each entity in the negative entity pair, the neural network comprising an embeddings layer, a time between the timestamps of the transactions of each positive entity pair being less than a time threshold;
        encode, by an embedding function, transaction data for a first new transaction;
        determine, by the embeddings layer of the neural network based on the encoded transaction data for the first new transaction, a vector for the first new transaction;
        determine a similarity between the vector for the first new transaction and a vector for a second transaction; and
        determine, based on the similarity between the vector for the first new transaction and the vector for the second transaction, that the first new transaction is related to the second transaction.

2. The system of claim 1, the memory storing instructions which when executed by the processor circuit cause the processor circuit to:
    train a model based on the embeddings layer of the neural network, the model associated each of the plurality of accounts.

3. The system of claim 2, the memory storing instructions which when executed by the processor circuit cause the processor circuit to:
    determine, by the trained model, that the first new transaction comprises: (i) a fraudulent transaction, (ii) an anomalous transaction, and (iii) a money laundering transaction, wherein a first positive entity pair of the plurality of positive entity pairs comprises a first transaction with a first merchant and a second transaction with a second merchant, the time between the timestamps of the first and second transactions less than the time threshold.

4. The system of claim 1, the memory storing instructions which when executed by the processor circuit cause the processor circuit to:
    receive the transaction log; and
    generate the network graph of transaction data based on one or more extract transform load (ETL) operations applied to the transaction log, the one or more ETL operations comprising: (i) standardizing the transaction log according to one or more formats, and (ii) assigning a unique identifier to each unique customer account in the transaction log, wherein a first negative entity pair of the plurality of negative entity pairs comprises a first transaction with a first merchant and a second transaction with a second merchant, the time between the timestamps of the first and second transactions greater than the time threshold.

5. The system of claim 4, the memory storing instructions which when executed by the processor circuit cause the processor circuit to:
    select a predefined number of the positive entity pairs from the network graph of transaction data;
    generate, for each positive entity pair, a predefined number of negative entity pairs; and
    generate the embeddings layer comprising a plurality of embedding values based on the training of the neural network using the selected positive entity pairs and the generated negative entity pairs.

6. The system of claim 5, wherein the training of the neural network refines the plurality of embedding values of the embeddings layer such that a respective distance between each positive entity pair is minimized relative to initial embedding values for the embeddings layer and a respective distance between each negative entity pair is minimized relative to the initial embedding values for the embeddings layer, wherein the embeddings layer associates each embedding value with one of the unique identifiers, wherein the vector for the first new transaction is further determined based on a unique identifier in the transaction data for the first new transaction, the memory storing instructions which when executed by the processor circuit cause the processor circuit to:
    generate a recommendation based on a location of the second transaction and a merchant of the second transaction, the recommendation specifying a different merchant in a different location relative to the second transaction.

7. The system of claim 1, wherein the similarity is based on one or more of: (i) a computed difference between the vector for the first new transaction and the vector for the second transaction, (ii) a cosine similarity of the vector for the first new transaction and the vector for the second transaction, and (iii) an inner product of the vector for the first new transaction and the vector for the second transaction, wherein the second transaction is associated with a first account of the plurality of accounts, wherein the similarity reflects that the first new transaction is associated with the first account.

8. A non-transitory computer-readable storage medium storing instructions that when executed by a processor of a computing device, cause the processor to:
    receive a network graph of transaction data based on a plurality of transactions, the network graph of transaction data defining relationships between the plurality of transactions, each transaction associated with at least a merchant and one account of a plurality of accounts, the network graph based on a transaction log for a plurality of prior transactions, the transaction log specifying, for each prior transaction, a customer account, a merchant, a timestamp, and a transaction amount;

train a neural network based on training data comprising a plurality of positive entity pairs from the network graph of transaction data and a plurality of negative entity pairs not present in the network graph of transaction data, the negative entity pairs comprising artificially generated relationships between each entity in the negative entity pair, the neural network comprising an embeddings layer, a time between the timestamps of the transactions of each positive entity pair being less than a time threshold;

encode transaction data for a first new transaction;

determine, by the embeddings layer of the neural network based on the encoded transaction data for the first new transaction, a vector for the first new transaction;

determine a similarity between the vector for the first new transaction and a vector for a second transaction; and determine, based on the similarity between the vector for the first new transaction and the vector for the second transaction, that the first new transaction is related to the second transaction.

9. The non-transitory computer-readable storage medium of claim 8, further storing instructions that when executed by the processor cause the processor to:

train a model based on the embeddings layer of the neural network, the model associated with each of the plurality of accounts.

10. The non-transitory computer-readable storage medium of claim 9, further storing instructions that when executed by the processor cause the processor to:

determine, by the trained model, that the first new transaction comprises one or more of: (i) a fraudulent transaction, (ii) an anomalous transaction, and (iii) a money laundering transaction, wherein a first positive entity pair of the plurality of positive entity pairs comprises a first transaction with a first merchant and a second transaction with a second merchant, the time between the timestamps of the first and second transactions less than the time threshold.

11. The non-transitory computer-readable storage medium of claim 8, further storing instructions that when executed by the processor cause the processor to:

receive the transaction log; and generate the network graph of transaction data based on one or more extract transform load (ETL) operations applied to the transaction log, the one or more ETL operations comprising: (i) standardizing the transaction log according to one or more formats, and (ii) assigning a unique identifier to each unique customer account in the transaction log, wherein a first negative entity pair of the plurality of negative entity pairs comprises a first transaction with a first merchant and a second transaction with a second merchant, the time between the timestamps of the first and second transactions greater than the time threshold.

12. The non-transitory computer-readable storage medium of claim 11, further storing instructions that when executed by the processor cause the processor to:

select a predefined number of the positive entity pairs from the network graph of transaction data;

generate, for each positive entity pair, a predefined number of negative entity pairs; and generate the embeddings layer comprising a plurality of embedding values based on the training of the neural network using the selected positive entity pairs and the generated negative entity pairs.

13. The non-transitory computer-readable storage medium of claim 12, wherein the training of the neural network refines the plurality of embedding values of the embeddings layer such that a respective distance between each positive entity pair is minimized relative to initial embedding values for the embeddings layer and a respective distance between each negative entity pair is minimized relative to the initial embedding values for the embeddings layer, wherein the embeddings layer associates each embedding value with one of the unique identifiers, wherein the vector for the first new transaction is further determined based on a unique identifier in the transaction data for the first new transaction, the medium storing instructions that when executed by the processor cause the processor to:

generate a recommendation based on a location of the second transaction and a merchant of the second transaction, the recommendation specifying a different merchant in a different location relative to the second transaction.

14. The non-transitory computer-readable storage medium of claim 8, wherein the similarity is based on one or more of: (i) a computed difference between the vector for the first new transaction and the vector for the second transaction, (ii) a cosine similarity of the vector for the first new transaction and the vector for the second transaction, and (iii) an inner product of the vector for the first new transaction and the vector for the second transaction, wherein the second transaction is associated with a first account of the plurality of accounts, wherein the similarity reflects that the first new transaction is associated with the first account.

15. A method, comprising:

receiving a network graph of transaction data based on a plurality of transactions, the network graph of transaction data defining relationships between the plurality of transactions, each transaction associated with at least a merchant and one account of a plurality of accounts, the network graph based on a transaction log for a plurality of prior transactions, the transaction log specifying, for each prior transaction, a customer account, a merchant, a timestamp, and a transaction amount;

training, a neural network based on a machine learning algorithm applied to training data comprising a plurality of positive entity pairs from the network graph of transaction data and a plurality of negative entity pairs not present in the network graph of transaction data, the negative entity pairs comprising artificially generated relationships between each entity in the negative entity pair, the neural network comprising an embeddings layer, a time between the timestamps of the transactions of each positive entity pair being less than a time threshold;

encoding, by an embedding function, transaction data for a first new transaction;

determining, by the embeddings layer of the neural network based on the encoded transaction data for the first new transaction, a vector for the first new transaction;

determining a similarity between the vector for the first new transaction and a vector for a second transaction; and determining, based on the similarity between the vector for the first new transaction and the vector for the second transaction, that the first new transaction is related to the second transaction.

16. The method of claim 15, further comprising:
training a model based on the embeddings layer of the neural network, the model associated with each of the plurality of accounts.

17. The method of claim 16, further comprising:
determining, by the trained model, that the first new transaction comprises one or more of: (i) a fraudulent transaction, (ii) an anomalous transaction, and (iii) a money laundering transaction, wherein a first positive entity pair of the plurality of positive entity pairs comprises a first transaction with a first merchant and a second transaction with a second merchant, the time between the timestamps of the first and second transactions less than the time threshold.

18. The method of claim 15, further comprising:
receiving the transaction log; and
generating the network graph of transaction data based on one or more extract transform load (ETL) operations applied to the transaction log, the one or more ETL operations comprising: (i) standardizing the transaction log according to one or more formats, and (ii) assigning a unique identifier to each unique customer account in the transaction log, wherein a first negative entity pair of the plurality of negative entity pairs comprises a first transaction with a first merchant and a second transaction with a second merchant, the time between the timestamps of the first and second transactions greater than the time threshold.

19. The method of claim 18, further comprising:
selecting a predefined number of the positive entity pairs from the network graph of transaction data;
generating, for each positive entity pair, a predefined number of negative entity pairs; and
generating the embeddings layer comprising a plurality of embedding values based on the training of the neural network using the selected positive entity pairs and the generated negative entity pairs.

20. The method of claim 19, wherein the training of the neural network refines the plurality of embedding values of the embeddings layer such that a respective distance between each positive entity pair is minimized relative to initial embedding values for the embeddings layer and a respective distance between each negative entity pair is minimized relative to the initial embedding values for the embeddings layer, wherein the embeddings layer associates each embedding value with one of the unique identifiers, wherein the vector for the first new transaction is further determined based on a unique identifier in the transaction data for the first new transaction, wherein the similarity is based on one or more of: (i) a computed difference between the vector for the first new transaction and the vector for the second transaction, (ii) a cosine similarity of the vector for the first new transaction and the vector for the second transaction, and (iii) an inner product of the vector for the first new transaction and the vector for the second transaction, wherein the second transaction is associated with a first account of the plurality of accounts, wherein the similarity reflects that the first new transaction is associated with the first account, the method further comprising:
generating a recommendation based on a location of the second transaction and a merchant of the second transaction, the recommendation specifying a different merchant in a different location relative to the second transaction.

* * * * *